L. Smith,
Gage Lathe.
Nº 16,192. Patented Dec. 9, 1856.
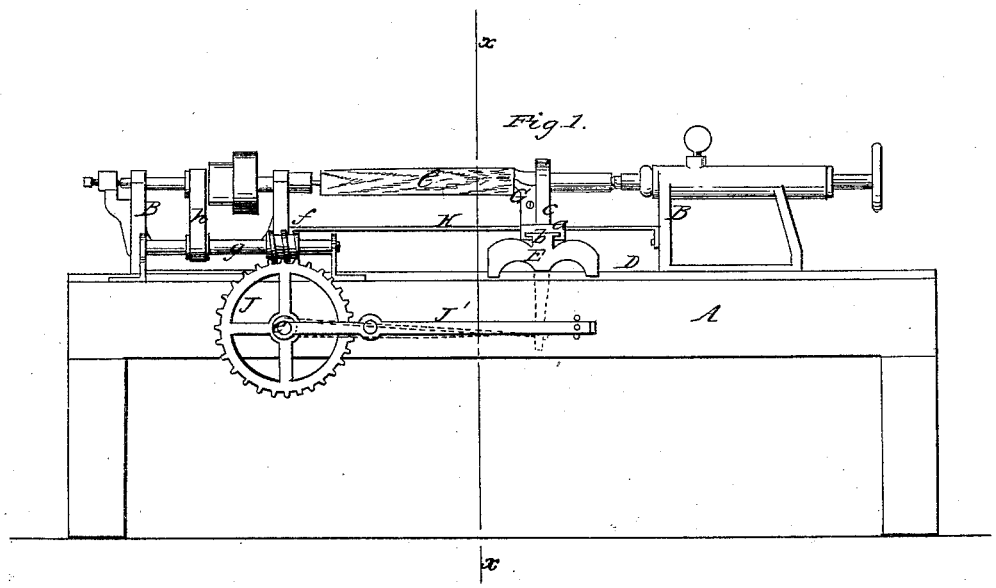
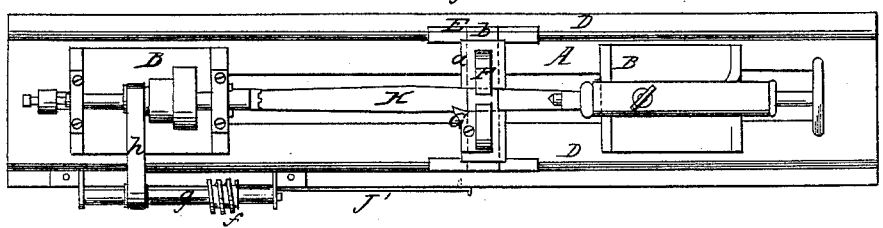
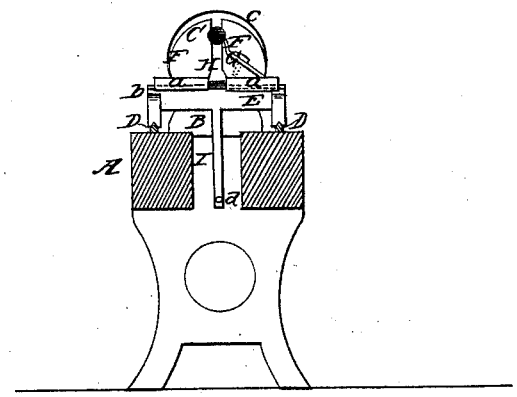

UNITED STATES PATENT OFFICE.

LEMUEL SMITH, OF PLYMOUTH, CONNECTICUT.

LATHE FOR IRREGULAR FORMS.

Specification of Letters Patent No. 16,192, dated December 9, 1856.

*To all whom it may concern:*

Be it known that I, LEMUEL SMITH, of Plymouth, in the county of Litchfield and State of Connecticut, have invented a new and Improved Machine for Turning Spokes, Hoe and Rake Handles, and other Articles of Variable Diameter; and I do hereby declare that the following is a full, clear, and exact description of the same, reference being had to the annexed drawings, making a part of this specification, in which—

Figure 1 is a side view of my improvement. Fig. 2 is a plan or top view of the same. Fig. 3 is a transverse vertical section of the same $(x)$ $(x)$ Fig. 1 showing the plane of section.

Similar letters of reference indicate corresponding parts in the several figures.

My invention consists in the employment or use of two expanding and sliding jaws, to one of which a cutter is attached, said jaws being placed and working on the bed of an ordinary turning lathe and used in connection with a pattern, the whole being arranged as will be hereinafter fully shown and described.

To enable those skilled in the art to fully understand and construct my invention I will proceed to describe it.

A represents the bed of an ordinary turning lathe, and B, B, are the two heads between which the "stuff" C, to be operated upon, is centered. The above parts are of usual construction and therefore do not require a minute description.

D, D, represent two ways or guides which are secured on the bed A, and E is a carriage which is placed on said ways or guides between the two heads B, B.

On the carriage E there are placed two jaws F F. These jaws are attached to plates $(a)$ $(a)$ which are fitted on guide plate $(b)$ on the carriage E. The two jaws F, F, have a spring $(c)$ placed over them, said spring having a tendency to press the two jaws toward each other. To one of the jaws a cutter G is attached as shown in all the figures.

H represents a pattern, the ends of which are secured to the inner sides of the two heads B, B. This pattern may be constructed of wood or metal, and is a longitudinal profile of the article to be turned. The jaws F are placed one at each side of the pattern, the plates $(a)$ $(a)$ being kept against the pattern by the spring $(c)$.

I represents a pendent which is attached to the under side of the carriage E. This pendent has a cord $(d)$ attached to its lower end, said end being attached to a shaft $(e)$ which passes transversely through the bed A—the end is shown by dotted lines in Fig. 1.

On one end of the shaft $(e)$ a toothed wheel J is placed and a screw $(f)$ gears therein, said screw being on a shaft $(g)$ which is rotated by a belt $(h)$ from the arbor in one of the heads B. The shaft $(e)$ is attached at one end to a lever J′ so that the wheel J may be thrown in and out of gear with the screw $(f)$ when desired.

The stuff C is centered between the two heads B, B, a jaw F being at each side of it, and as the stuff C is rotated the cutter G acts upon the stuff and the carriage E is drawn along by the end $(d)$ which is wound upon the shaft $(e)$ the jaws F, F, being expanded and contracted by the pattern H, and spring $(c)$, so that the stuff will be turned corresponding in form to the pattern. The jaws serve to steady the stuff and prevent all tremor so that the work will be turned in an even and perfect manner.

Having thus described my invention, what I claim as new and desire to secure by Letters Patent, is—

The two expanding jaws F, F, placed on the carriage E which works on the bed A of the turning lathe, in combination with the pattern H, the cutter G being attached to one of the jaws and the whole arranged as shown and described for the purpose specified.

LEMUEL <sup>his</sup> X <sub>mark</sub> SMITH.

Witnesses:
AARON D. WELLS,
ANNIE GIDDINGS.